April 4, 1950

F. H. BLANDING 2,502,954

APPARATUS FOR CONTACTING SOLIDS AND GASEOUS FLUIDS

Filed March 9, 1946

INVENTOR
FORREST H. BLANDING,
BY
George J. Silhavy
ATTORNEY

April 4, 1950

F. H. BLANDING 2,502,954

APPARATUS FOR CONTACTING SOLIDS AND GASEOUS FLUIDS

Filed March 9, 1946

INVENTOR
FORREST H. BLANDING,
BY George J. Silhavy
ATTORNEY

Patented Apr. 4, 1950

2,502,954

UNITED STATES PATENT OFFICE 2,502,954

APPARATUS FOR CONTACTING SOLIDS AND GASEOUS FLUIDS

Forrest H. Blanding, Elizabeth, N. J., assignor to Standard Oil Development Company, a corporation of Delaware Application March 9, 1946, Serial No. 653,423

2 Claims. (Cl. 23—288)

This invention relates to contacting solid particles and gaseous fluids, and more particularly, relates to stripping or purging catalyst or contact particles to remove volatile material therefrom.

In the catalytic conversion of hydrocarbons, the catalyst or contact particles become contaminated or inactivated by the deposition of coke or hydrogen-containing carbonaceous material on the particles and the particles must be regenerated, usually by burning with air or other oxygen-containing gas to remove the coke before returning the catalyst particles to a catalytic conversion zone. Before regeneration it is necessary to strip or remove volatile hydrocarbons from the particles in order to reduce the load on the regeneration zone.

In catalytic conversion operations, using finely divided or powdered catalyst or contact material, the stripping of the spent or contaminated particles has recently been an extremely important problem. There are distinct advantages in such operations in operating at high catalyst to hydrocarbon feed ratios by weight but incomplete stripping of the spent catalyst or contact particles at these high ratios in present cracking plants causes excessive carbon or coke deposits which usually limits the throughput of these plants.

Furthermore, extremely high amounts of stripping steam are normally used as the stripping gas, and it is known that steam has a deactivating effect on the catalyst particles. Hence, it is desirable to keep the amount of stripping steam to a minimum.

Also, if incomplete stripping is obtained in a stripping zone or vessel, excess carbon or carbon-containing material is burned in the regeneration zone due to oil vapors entrained with the spent catalyst and carbonaceous material or coke formed on the catalyst particles due to extensive cracking in the stripping zone of the oil vapors which are entrained into the stripping zone.

According to my invention, the catalyst or contact particles to be stripped are passed from the lower part of a reaction zone or vessel in a relatively dense fluidized liquid-simulating condition into the first section of my improved stripping design. This first section is a high density settling section having a large cross-sectional area in which the velocity of the stripping gas is low and wherein the catalyst or contact particles during stripping are settled to a high density to expel a considerable amount of entrained vapors. Preferably this first section contains baffles to increase the efficiency of the stripping zone or vessel.

The catalyst or contact particles being stripped are then passed to an intermediate or high velocity section to strip the particles while they are maintained in a less dense suspension than exists in the first stripping section.

The catalyst or contact particles are then passed to a third section which comprises another high density settling section.

In another form of my invention an automatically controlled slide valve is provided between the first high density settling section and the high velocity section to maintain a dilute or disperse phase suspension in the high velocity section which is less dense than the suspension in the intermediate stripping zone above mentioned in the first form.

In the preferred form of apparatus, the high density stripping section forms part of the lower portion of the reaction zone or vessel and communicates directly with the high velocity or less dense section which is arranged directly beneath the first high density settling section. Arranged below the high velocity section is the second high density settling section.

The stripped particles are removed from the bottom of the second high density stripping section and passed into a standpipe for developing sufficient hydrostatic pressure for passing the stripped spent particles to a regeneration zone for regenerating the particles.

Figures 1, 2:
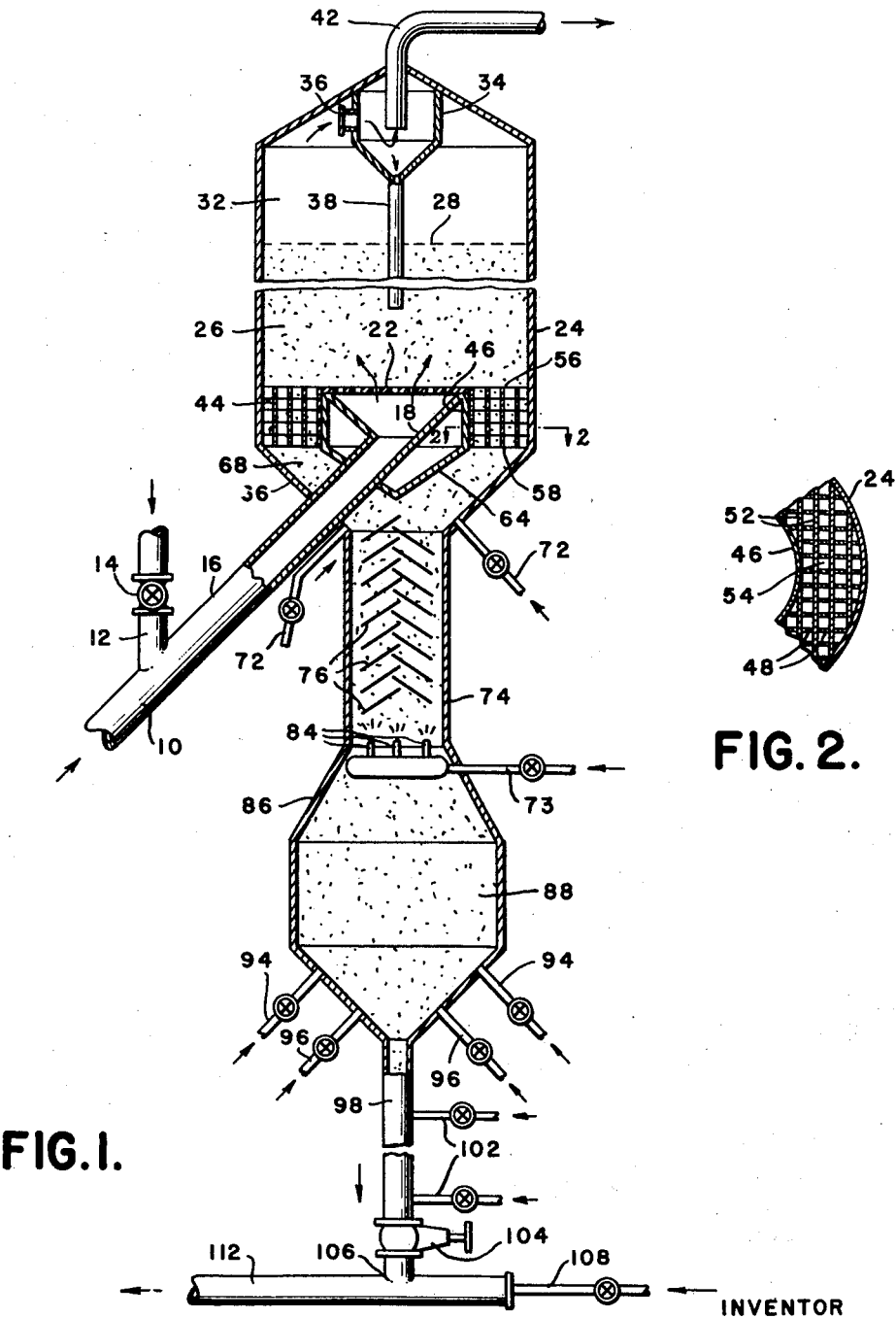
Fig. 1 represents one form of apparatus which may be used for carrying out my invention.
Fig. 2 represents a partial horizontal cross-section taken substantially on line 2—2 of Fig. 1 to show the annular stripping construction.

Referring now to the drawings, and, more particularly, to Figs. 1 and 2, the reference character 10 designates a line for introducing hydrocarbon feed or other reactants. Catalyst or contact particles are introduced into line 10 from standpipe 12 provided with a control valve 14 for controlling the rate of introduction of catalyst particles into the line 10. The catalyst to oil ratio in fluid catalytic cracking may vary between about one part of catalyst to one of oil to 40 parts of catalyst to one of oil by weight. The standpipe 12 contains hot regenerated catalyst particles fed into the standpipe from a regeneration zone (not shown). However, catalyst particles and feed material may be separately introduced into vessel 24.

The mixture of material to be reacted and the catalyst or contact particles is passed through line 16 into an inverted cone feed member 18 provided in its upper portion with a perforated distribution member or grid member 22 arranged in the bottom of a reaction vessel 24. The vessel 24 is preferably cylindrical and the grid member 22 is circular and arranged concentrically with the vessel 24 in the bottom thereof.

In the catalytic conversion of hydrocarbons, the feed material may comprise gas oil, heavy naphtha, reduced crude, hydrocarbon oil, etc. The feed may be introduced in the form of vapors or as a partly preheated liquid containing some vapors. If the feed is only partly preheated, a sufficient amount of hot regenerated catalyst particles is introduced into line 10 for vaporizing the feed and raising it to cracking or conversion temperature.

The temperature during conversion of hydrocarbons may range from 750° F. to 1050° F. and preferably about 925° F. in the catalytic cracking of hydrocarbons to form high anti-knock gasoline. The catalyst in the catalytic cracking of hydrocarbons may comprise acid-treated bentonites, synthetic silica alumina gels, synthetic silica magnesia gels, etc. For other hydrocarbon conversion operations, such as catalytic reforming and the like, suitable reforming or other catalysts are used.

The catalyst is preferably in finely divided form having a particle size between about 200 and 400 standard mesh and containing about 0% to 30% by weight of 0 to 20 micron material. The temperature of the hot regenerated catalyst or contact particles in line 12 is about 900° F. to 1100° F.

Returning now to the reaction vessel 24, the hydrocarbon feed and catalyst particles are introduced into the vessel 24 and the superficial velocity of the upflowing vapors is selected to maintain the solid particles in a dense dry fluidized liquid-simulating turbulent condition shown at 26 and having a level at 28. The superficial velocity is that velocity measured with the vessel empty and may be between about 0.5 ft./second to 2.0 ft./second. Under these conditions and using the 200 to 400 mesh silica-alumina catalyst material above described, the density of the fluidized mixture in reactor 24 may vary between about 15 lbs./cu. ft. and 35 lbs./cu. ft.

Above the dense mixture 26 is a dilute phase or dilute suspension 32 comprising vaporous reaction products containing some entrained catalyst particles. The upper portion of the reaction vessel 24 designated by the reference character 32 comprises a settling section in which the catalyst particles fall back into the dense mixture 26 so that only a dilute suspension or disperse phase 32 is superimposed above the dense mixture 26. The density of the dilute suspension in space 32 may vary between about .005 lb./cu. ft. to 1 lb./cu. ft. when using the silica alumina catalyst.

The vaporous reaction products containing some entrained catalyst particles leave the dilute phase section 32 and are passed into separation means 34 through inlet line 36 for removing or separating most of the solid particles from the vaporous reaction products. The separation means is shown as a cyclone separator arranged in the upper portion of the reaction vessel 24 but other forms of separation devices may be used as, for example, Multiclones. If desired, more than one separating stage may be used in series.

The separated solid particles collect in the separation means 34 and are returned to the dense bed or mixture 26 through dip pipe 38. The vaporous reaction products substantially free of catalyst particles pass overhead through line 42 for recovery of desired products. In the catalytic cracking of hydrocarbons, the vaporous reaction products are passed to a fractionation system for recovery of gasoline from other fractions.

During the reaction in the reaction vessel 24, the catalyst or contact particles become contaminated or partially deactivated by the deposition of coke or hydrogen-containing carbonaceous material thereon. The particles are removed from the reaction vessel 24, stripped and passed to a regeneration zone (not shown) for regenerating the catalyst particles. The partially spent catalyst or contact particles at a temperature of about 750° F. to 1050° F. are preferably withdrawn from the bottom portion of the reaction zone as a dense fluidized mixture 24 and passed into an annular stripping section 44 arranged below the distribution grid 22 and between a vertical sleeve 46 which depends from the distribution plate 22 and the inner wall of the reaction vessel 24. This first stripping section has a relatively large horizontal cross-sectional area and forms a high density low velocity stripping section. The density of the fluidized mixture in stripping section 44 is higher than the density of the mixture in reactor 24 and there is less turbulence in section 44 than in reactor 24.

With a large cross-sectional area in the stripping zone, the stripping is not as efficient as with a smaller diameter stripping section. To improve the stripping of the large cross-sectional area stripping zone, I provide baffles to produce a large number of small diameter cells. Any suitable form of baffles may be used, such as a disc and doughnut type construction or an egg crate construction, such as shown in Fig. 2, or other forms of baffling to produce a large number of small diameter vertical passages.

In Fig. 2 I have shown an egg crate construction in which parallel vertical plates 48 extend from the sleeve 46 to the inner wall of the reaction vessel 24. Extending at right angles to the parallel plates 48 are other plates 52 which form cells 54 in the stripping zone 44. The plates extend from the top of the stripping zone 44 as shown in 56 to about the bottom 58 of the stripping zone. If desired, the plates may extend further down than shown in the drawing in order to extend the cellular section of the stripping zone.

As above pointed out, the stripping zone 44 has a large cross-sectional area and a low velocity of stripping gas is used in order to maintain the fluidized particles as a high density mixture. The superficial velocity of the stripping gas in the stripping zone 44 is about 0.2 ft./second to 1 ft./second. The density of the fluidized mixture in the initial high density settling section 44 is about 25 lbs./cu. ft. to 37 lbs./cu. ft. The stripping gas passing up through the stripping section 44 is supplied from a lower stripping section presently to be described.

It will be noted that the density of the mixture in the high density stripping section 44 is increased or is greater than the density of the fluidized mixture in the reaction zone or vessel 24. By increasing the density of the mixture in the stripping zone 44 a considerable amount of the entrained vapors will be expelled and this will make it easier to remove the rest of the volatile material from the catalyst particles as they pass downwardly to the next stripping section.

When oil vapors admixed with the spent catalyst enter the stripping zone 44, they encounter an extremely severe cracking condition which may be equivalent to a catalyst to oil ratio of 500 and higher because of the higher density of the mixture in the stripping zone and because of less turbulence. This results in extensive cracking of the entrained oil vapors and considerable amounts of coke or carbonaceous material are deposited on the catalyst in the stripper. In order to eliminate this cracking, it is necessary to entrain the least quantity of oil possible with the catalyst going into the stripper and to strip these oil vapors as rapidly as possible so that they will not be cracked extensively. These results are obtained with my high density low velocity settling stripping section 44. The stripping gas and stripped out material passes upwardly into the dense bed or mixture 26 in the reaction vessel 24.

The sleeve 46 has its bottom portion closed by inverted conical member 64 which is concentric with and spaced from the conical bottom 66 of the reaction vessel 24 to form a confined passageway 68 below the stripping section 44. Small portions of fluidizing gas may be introduced into the conical bottom 66 of the vessel 24 through one or more lines 72 to maintain the particles in a fluidized condition so that they flow readily through the passageway 68 if this is necessary, although usually the gas introduced through pipe 73 will accomplish this purpose. The dense mixture is introduced into the upper portion of a small diameter high velocity stripping section 74 provided with a plurality of baffles 76. These baffles should preferably be arranged so that there is no direct vertical passageway through which the catalyst or gas can pass. Stripping gas is introduced through line 73 provided at its inner end with a plurality of nozzles or outlets for introducing the stripping gas at the base of the high velocity stripping section 74. In the high velocity section 74, the residual oil vapors not removed in the high density section 44 will be removed.

The catalyst or contact material introduced into the upper part of the high velocity section 74 is dispersed in the stripping gas and forms a less dense suspension having a density of about 10 lbs./cu. ft. to 25 lbs./cu. ft. The superficial velocity of the stripping gas in section 74 is about 1 ft./sec. to 5 ft./sec. The less dense phase stripping occurring in the baffled narrow section 74 is very effective in removing entrained volatile material from the particles, and in breaking up dense agglomerates of fine particles which entrain hydrocarbon vapors. The stripping gas and the stripped out material passes upwardly through the first stripping section 44 and into the dense bed or mixture 26 in the reaction vessel 24. The stripping gas introduced through line 73 passes up through section 74 and forms the stripping gas introduced into the bottom portion of high density stripping section 44.

From the bottom portion of the narrow high velocity stripping section 74 the catalyst or contact particles pass into a third stripping section 88 which is another high density low velocity stripping or settling section. This third section is shown at 86 in Fig. 1 and while it is shown of an enlarged diameter, may have the same diameter as the stripping section 74. The solid particles are collected in the third stripping section 86 as a high density liquid-simulating mixture 88 having a level at about the top of pipe 73. However, this level may be varied. Small quantities of fluidizing and stripping gas are introduced into the bottom portion of the third stripping section 86 through lines 94 and 96 to maintain the particles in a dense fluidized condition while stripping any residual volatile material therefrom. However, in order to obtain the highest possible density in this section, only the minimum quantity of gas required to keep the catalyst in a fluid suspension is used.

The dense fluidized mixture in the third stripping section 84 has a density of about 30 lbs./cu. ft. to 45 lbs./cu. ft. and the density is higher than that of the mixture in reactor 24. Also there is less turbulence in the dense mixture 88 in section 86 than there is in the mixture 26 in reactor 24. The superficial velocity of the stripping gas passing upwardly through the third stripping section 86 is about 0.05 ft./second to 0.2 ft./second. The stripping gas and the stripped out material from the top of the third stripping section 86 pass through the narrow high velocity stripping section 74 and the top high density stripping section 44 into the dense bed or mixture 26 in the reaction vessel 24. If desired, the stripping gas and stripped out material may be withdrawn from the upper portion of the intermediate stripping section, introduced into dust separating means, such as a cyclone separator, to remove solids and then introduced into the dilute suspension 32 above the dense mixture 26 in the reaction vessel 24 so as to avoid passage of the hydrocarbon vapors through the dense bed or mixture 26. The separated solids from the separating means (not shown) are preferably returned to the upper end of section 74.

From the high density settling section 86 the stripped spent catalyst or contact particles are passed into the upper portion of a standpipe 98 provided with lines 102 for introducing small amounts of fluidizing gas to maintain the particles in a dense dry liquid-like condition in the standpipe. A sufficient height of standpipe is provided to produce a hydrostatic pressure at the base thereof sufficient to pass the particles to the regeneration zone (not shown). The standpipe 98 is provided with a control valve 104 for controlling the rate of withdrawal of spent catalyst particles from the standpipe. The stripped spent particles are introduced from the standpipe 98 to line 106 wherein they are mixed with a regenerating gas, such as air, introduced through line 108 to form a less dense suspension which is then passed through line 112 to the regeneration zone (not shown).

The regeneration zone may be of a structure similar to the reactor 24 or it may take other forms. The regeneration is preferably carried out in a dense fluidized condition similar to that above described in connection with the reaction vessel 24. The dense fluidized regenerated catalyst particles are preferably withdrawn from the lower portion of a regeneration zone and introduced into standpipe 12 for return to the reaction vessel 24.

Figures 3, 4:
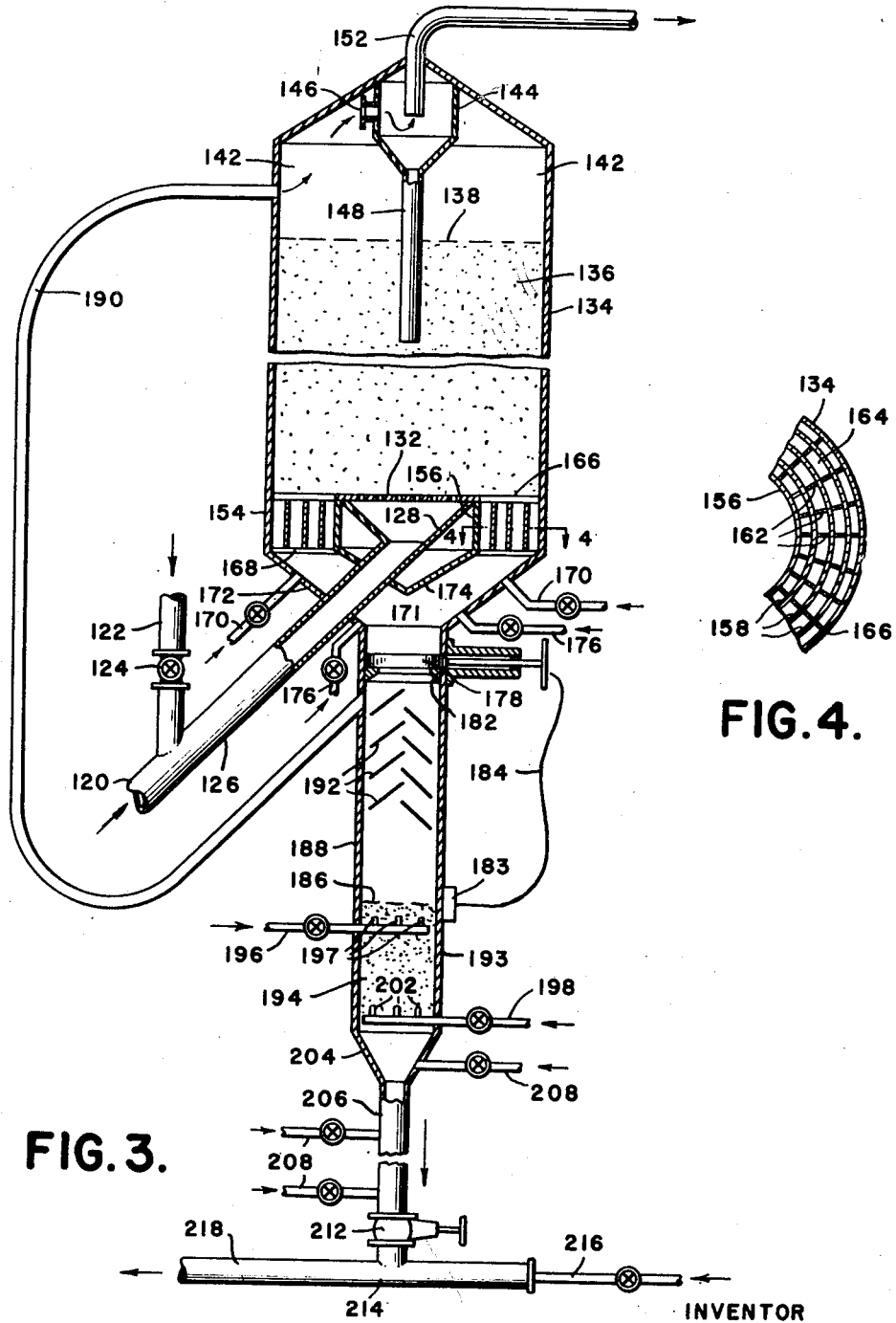
Fig. 3 represents another form of apparatus which may be used for carrying out my invention in which a slide valve is provided between the upper high density settling section and the lower high velocity section.
Fig. 4 represents a partial horizontal cross-sectional view taken substantially on line 4—4 of Fig. 3 to show another form of annular construction for the high density settling section.

Referring now to Figs. 3 and 4 of the drawing, it will be noted that the general assembly of the apparatus is the same as that described in connection with Figs. 1 and 2 and the apparatus shown in Figs. 3 and 4 will be briefly described except as to those parts which differ from the showing in Figs. 1 and 2. In Fig. 3 I have added a slide valve between the first high density stripping section and the high velocity stripping section. The valve is preferably automatically controlled by the level of the dense fluidized mixture contained in the bottom high density stripping section.

The reference character 120 designates a feed inlet line into which catalyst or contact particles are introduced from regenerated catalyst standpipe 122 having a valve 124. The mixture of particles and reactants is passed through line 126 to inverted cone number 128 having a perforated distribution plate or grid member 132 in its upper portion. The grid 132 is arranged in the bottom portion of the cylindrical reaction vessel 134.

The particles in the reaction vessel 134 are maintained in a dense fluidized turbulent dry liquid-simulating condition shown at 136 having a level 138 with a dilute or disperse phase 142 superimposed thereabove. A separating means 144 is arranged in the upper portion of the reaction vessel 134 for separating entrained solid particles from vaporous reaction products. The separating means 144 has an inlet 146. The separated solid particles are returned to the dense bed or mixture 136 through line 148. Vaporous reaction products pass overhead from the separating means 144 through line 152 and are passed to suitable separation and recovery equipment.

A high density stripping section 154 is arranged in the lower part of the reaction vessel 134. This stripping section is an annular one arranged between sleeve 156 and the inner wall of the reaction vessel 134. The sleeve 156 depends from the distribution plate 132. As pointed out above in the description of Figs. 1 and 2, the initial high density stripping section has a large cross-sectional area and the velocity of the stripping gas passing upwardly therethrough is maintained low to strip the particles while they are in a dense fluidized condition. The stripping of such a large cross-sectional area stripping zone is improved by introducing baffles into the stripping section. Any suitable form of baffling may be used, such as a disc and doughnut type construction, the egg crate construction shown in Figs. 1 and 2, and other baffling may be used.

The baffling shown in Fig. 4 differs from that shown in Fig. 3 and will now be more specifically described.

The baffled high density stripping section 154 comprises concentric annular members 158 and intersecting radial members 162 to form cells 164. The members 158 and 162 forming the cells extend from the top 166 of the stripping section 154 to the bottom 168 thereof. If desired, the members may extend further down below the high density stripping section 154.

Stripping gas is introduced through one or more lines 170 below the bottom of the stripping section 154. The superficial velocity of the stripping gas is about 0.2 ft./second to 1 ft./second to give a density in the stripping section 154 of about 25 lbs./cu. ft. to 37 lbs./cu. ft.

The dense fluidized stripped material flows down through passageway 171 between the conical bottom 172 of vessel 134 and inverted conical member 174 which is secured to the bottom portion of the sleeve 156. Fluidizing and stripping gas is introduced through line or lines 176 near the base of the reaction vessel 134 for maintaining the particles in fluidized condition as they flow through the passage 171.

A slide valve 178 rests on seat 182 arranged at the bottom of the reaction vessel 134 below high density stripping section 154. The slide valve 178 is preferably automatically controlled by lever controller 183 and control means 184. The control device 183 is responsive to changes in level of the catalyst or contact particles shown at 186 in the next stripping stage to be presently described. The catalyst passing from the high density stripping section is passed through the opening in valve seat 182 to the top of a narrow high velocity stripping section 188 provided with baffles 192. Any form of baffles may be used. In the high velocity stripping section 188 the catalyst is in a dilute phase or a dilute suspension and very good stripping is obtained under these conditions. The catalyst suspension in the intermediate section 188 is much less dense than the catalyst suspension in intermediate section 74 in Fig. 1.

The slide valve in its operation permits continuous or intermittent additions of dense fluidized mixtures of catalyst or contact particles into the upper part of the high velocity stripping section 188. The slide valve minimizes circulation of catalyst between the top stripping section vessel 134 and the dilute phase stripping section. It permits the catalyst to be dropped in a dilute phase onto the baffles, where the gas-particle agglomerates are broken up.

A pipe 190 connects the upper portion of stripping section 188 with the top of the reactor 134 and communicates with the dilute phase section 142 in the reactor. The pipe 190 allows vapors and gases introduced into the lower portion of stripping section 188 to escape from the top of the section 188. The pipe is necessary because a pressure drop is obtained across valve 178, the pressure below the valve being less than the pressure above the valve. Solids entrained in the gaseous fluid passing through line 190 are separated to some extent in settling space 142 where the velocity of the gas is decreased and further separated in separating means 144 in the top of reaction vessel 134.

The stripped particles are collected in a third high density stripping section 193 as a dense fluidized mass 194 having a level as above described at 186. Stripping gas for section 188 is passed through line 196 provided with outlets or nozzles 197 below the level 186 of the dense fluidized mixture. In this way, the stripping gas will be more evenly distributed across the area of the high velocity stripping section 188. The superficial velocity of the stripping gas in intermediate stripping section 188 is between about 1.5 and 5 ft./second. The level 186 is selected as desired and is maintained by level control means 183 and 184 associated with slide valve 178 for regulating passage of catalyst from stripping zone 154 to stripping zone 188.

Small amounts of additional stripping gas are introduced through line 198 having outlets or nozzle members 202 arranged in the bottom portion of the dense mixture 194. The superficial velocity of the upflowing stripping gas in the high density stripping section 193 is about 0.05 ft./second to 0.2 ft./second. The density of the fluidized mixture 194 in section 193 is about 30 lbs./cu. ft. to 45 lbs./cu. ft.

The bottom portion of the last-mentioned high density stripping section 193 has a converging bottom or conical bottom 204. The dense fluidized stripped material is introduced into the upper part of a standpipe 206 provided with fluidizing lines 208 for maintaining the particles in a fluidized liquid-simulating condition in the standpipe. The standpipe 206 is provided with a control valve 212 at its bottom portion for feeding spent stripped particles into line 214 where they are mixed with a regenerating gas introduced through line 216 and the resulting mixture is passed through line 218 to a regeneration zone (not shown).

In both forms of my invention shown in Figs. 1 and 3, the downward flow of catalyst through the first high density stripping section as, for example, section 44, is about 100–300 lbs./sq. ft./minute. The downward flow of the particles in the high velocity stripping section as, for example, section 74, is about 200–1000 lbs. of particles per square foot per minute. The downward flow of particles in the second high density stripping section 86 is about 100–1000 lbs. of particles per square foot per minute.

A theoretical minimum of one volume of stripping gas per volume of gas associated with the catalyst or contact particles is required to accomplish good stripping. In usual operations, the stripping gas is used between about one and two volumes of stripping gas per volume of volatile material associated with the particles. In my invention, by using the settling sections, smaller amounts of stripping gas, such as steam, will be used because of the smaller volume of volatile material associated with the catalyst or contact particles.

If desired, more baffles may be placed in the upper part of section 188 nearest the slide valve 178 to prevent any excessive flow of catalyst down through the high density settling section 154 at this point.

In a commercial design where the reaction vessel 24 is about 23 ft. in diameter, the annular stripping section 44 has an inner diameter of about 15 ft. The initial high density stripping section 44 may be from 2 to 15 ft. in height, preferably about 8 ft. The baffling in the high density stripping section 44 may be such as to provide cells 12" in diameter and smaller, and preferably as small as 3" in diameter. The high velocity narrow stripping section 74 may be about 5 to 20 ft. in height, preferably about 15 ft.

The level 186 of the dense phase catalyst 194 is about 10 to 15 feet below slide valve 178.

While I have shown a certain type of baffling in Fig. 1, it is to be understood that disc and doughnut baffles may be used or a Venetian blind type of baffle may be used in this high velocity stripping section and also in the same section shown in Fig. 3.

The dense mixture in the bottom of the second high density stripping section 188 should be about 3 ft. to 10 ft. in height.

While I have described my invention more specifically in connection with the catalytic conversion of hydrocarbons, it is to be understood that my invention may be used in other processes, such as distillation of oil from shale, hydroforming by the fluid technique, Fischer synthesis, carbonization of coal, etc., in which it is desired to remove as much of the entrained volatile material as possible from finely divided contact material.

While I have shown the grid (22 in Fig. 1 and 132 in Fig. 3) as being circular and centrally located in the bottom of the reactor with the dense stripping zone (44 in Fig. 1 and 154 in Fig. 3) in the annular space around the grid, it is within the contemplation of my invention to have the grid in the annular space for introducing the catalyst particles and gaseous fluid and have the dense phase stripping and settling section in the center and lower part of the reactor as a circular central well or draw-off line. In this modification the central circular dense phase stripping and settling section has a relatively large horizontal cross sectional area to form a high density low velocity stripping section as above described in connection with Figs. 1 and 3.

While I have disclosed several forms of apparatus and have set forth conditions for converting hydrocarbons, it is to be understood that my invention is not to be restricted thereto as modifications and changes may be made without departing from the spirit of my invention.

I claim:

1. An apparatus of the character described including a cylindrical vessel having a top outlet for gaseous fluid, means for introducing solids and gaseous fluid into the lower central part of said vessel, an annular stripping section arranged in the lower portion of the said vessel and surrounding said first-mentioned means for stripping solids withdrawn from the lower portion of said vessel, means for conducting solids from said first stripping section to the upper portion of a second vertically arranged stripping section, a valve between said first and second stripping sections, said second stripping section being arranged below said first stripping section, said second stripping section being provided with spaced baffles, means for introducing stripping gas into the bottom portion of said first-mentioned and second-mentioned stripping sections, means for withdrawing gas from top of second-mentioned stripping section, a third stripping section communicating at its upper portion with the bottom of said second stripping section for receiving stripped solids from said second section, means for introducing a stripping gas at a reduced velocity into said third stripping section to maintain the solid particles in a dense fluidized condition therein, means for withdrawing stripped solids from the bottom portion of said third stripping section and control means associated with said valve actuated in response to changes in the level of the dense bed in said third stripping section to close said valve when said level rises and to open said valve when said level falls.

2. An apparatus of the character described including a cylindrical vessel having a top outlet for gaseous fluid, means for introducing solids and gaseous fluid into said vessel arranged centrally of said vessel, an annular stripping section for stripping solids during passage from the bottom portion of said vessel arranged in the lower portion of the said vessel and surrounding said means for introducing solids and gaseous fluid into the cylindrical vessel, baffle members arranged in said annular stripping section, means for conducting solids from said first stripping section to the upper portion of a second vertically arranged stripping section, said second stripping section having a smaller diameter than said first stripping section and being arranged below said first stripping section, said second stripping section being provided with spaced baffies, means for introducing stripping gas into the bottom portion of said first-mentioned and second-mentioned stripping sections, a third stripping section communicating at its upper portion with the bottom of said second stripping section for receiving stripped solids from said second section, means for introducing a stripping gas at a reduced velocity into said third stripping section to maintain the solid particles in a dense fluidized condition therein, a standpipe below said third stripping section and means for withdrawing stripped solids from the bottom portion of said third stripping section and for passing the withdrawn solids to said standpipe.

FORREST H. BLANDING.

REFERENCES CITED

The following references are of record in the file of this patent:

UNITED STATES PATENTS

| Number | Name | Date |
|---|---|---|
| 2,326,705 | Thiele et al. | Aug. 10, 1943 |
| 2,367,694 | Snuggs | Jan. 23, 1945 |
| 2,391,336 | Ogorzaly | Dec. 18, 1945 |
| 2,391,944 | Carlsmith | Jan. 1, 1946 |
| 2,394,814 | Snuggs | Feb. 12, 1946 |
| 2,440,620 | Taff | Apr. 27, 1948 |